US009088574B2

(12) United States Patent
Allegri et al.

(10) Patent No.: US 9,088,574 B2
(45) Date of Patent: Jul. 21, 2015

(54) SUBSCRIBER IDENTITY MODULE-BASED AUTHENTICATION OF A WIRELESS DEVICE AND APPLICATIONS STORED THEREON

(71) Applicant: International Business Machines Corporation, Armonk, NY (US)

(72) Inventors: Anthony J. Allegri, Roswell, GA (US); Jermaine C. Edwards, Allen, TX (US); Christopher E. Holladay, Marietta, GA (US); Matthew B. Trevathan, Roswell, GA (US); Sumedh W. Sathaye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 13/945,010

(22) Filed: Jul. 18, 2013

(65) Prior Publication Data

US 2015/0026826 A1    Jan. 22, 2015

(51) Int. Cl.
*H04L 29/06* (2006.01)
*G06F 21/10* (2013.01)
*G06F 21/12* (2013.01)

(52) U.S. Cl.
CPC ............... *H04L 63/10* (2013.01); *G06F 21/10* (2013.01); *G06F 21/121* (2013.01)

(58) Field of Classification Search
None
See application file for complete search history.

(56) References Cited

U.S. PATENT DOCUMENTS

| | | | |
|---|---|---|---|
| 6,748,538 B1 * | 6/2004 | Chan et al. .................... 726/26 |
| 7,725,734 B2 | 5/2010 | Bumiller et al. | |
| 8,116,733 B2 | 2/2012 | Kotzin | |
| 8,171,529 B2 * | 5/2012 | Dadu et al. .......................... 726/4 |
| 8,204,475 B2 | 6/2012 | Sakargayan | |
| 8,254,892 B2 | 8/2012 | Chien | |
| 2002/0073325 A1 * | 6/2002 | Ho et al. ........................ 713/189 |
| 2004/0268149 A1 * | 12/2004 | Aaron ............................. 713/201 |
| 2005/0005098 A1 * | 1/2005 | Michaelis et al. ............. 713/156 |
| 2006/0156140 A1 * | 7/2006 | Van Haegendoren et al. .............................. 714/741 |
| 2007/0209060 A1 * | 9/2007 | Rhodes .............................. 726/3 |
| 2007/0287433 A1 * | 12/2007 | Wollersheim et al. ....... 455/414.1 |
| 2008/0208921 A1 * | 8/2008 | Bumiller et al. ............... 707/201 |

(Continued)

OTHER PUBLICATIONS

Shoufan et al., High-Performance Rekeying Processor Architecture for Group Key Management, copyright 2009, IEEE, 14 pages.*

(Continued)

*Primary Examiner* — Luu Pham
*Assistant Examiner* — Baotram Tran
(74) *Attorney, Agent, or Firm* — Schmeiser, Olsen & Watts; Mark Vallone

(57) ABSTRACT

An approach is provided for performing a device-level and/or an application-level security check of a device. In the device-level check, a device hash is generated based on a subscriber identity module identifier (SIM ID), a device identifier, the number of secured applications, and the names of the secured applications. A temporary device hash is generated during a booting of the device. If the device hash is determined to not match the temporary device hash, the applications are removed from the device during the booting of the device. In the application-level check, an application hash is generated based on the SIM ID, the device identifier, and the application name. A temporary application hash is generated during a loading of the application. If the application hash is determined to not match the temporary application hash, the application is removed from the device without running the application.

17 Claims, 6 Drawing Sheets

(56) References Cited

U.S. PATENT DOCUMENTS

| | | | |
|---|---|---|---|
| 2009/0068988 A1 | 3/2009 | Cofta | |
| 2009/0312055 A1 | 12/2009 | Liu | |
| 2010/0293388 A1* | 11/2010 | Ammer et al. | 713/187 |
| 2010/0317320 A1* | 12/2010 | Sakargayan | 455/410 |
| 2011/0099629 A1* | 4/2011 | Boesgaard | 726/22 |
| 2012/0066515 A1* | 3/2012 | Kasuya | 713/189 |
| 2012/0079287 A1* | 3/2012 | Leclercq | 713/192 |
| 2012/0115442 A1 | 5/2012 | Dadu et al. | |
| 2012/0225640 A1 | 9/2012 | Bosch et al. | |
| 2013/0212571 A1* | 8/2013 | Matsuura et al. | 717/170 |
| 2013/0225204 A1* | 8/2013 | Mathews | 455/456.3 |
| 2014/0007229 A1* | 1/2014 | Smith et al. | 726/22 |
| 2014/0223537 A1* | 8/2014 | Islam et al. | 726/12 |

OTHER PUBLICATIONS

Sharma et al., Password Based Authentication: Philosophical Survey, copyright 2010, IEEE, 4 pages.*

Sediyono et al., Secure Login by Using One-time Password Authentication Based on MD5 Hash Encrypted SMS, copyright 2013, IEEE, 5 pagesHe et al., Design of the password-authenticated protocol based on mosaic image test, copyright 2010, IEEE, 5 pages.*

Lee et al., A Remote User Authentication Scheme Using Hash Functions, Oct. 2002, National Chiao-Tung University, Taiwan.*

Liu, et al.; An Efficient SIM-Based Authentication and Key Distribution Method for Wireless LANs; CCECE/CCGEI, Saskatoon, May 2005; pp. 1169-1172.

* cited by examiner

US 9,088,574 B2

SUBSCRIBER IDENTITY MODULE-BASED AUTHENTICATION OF A WIRELESS DEVICE AND APPLICATIONS STORED THEREON

TECHNICAL FIELD

The present invention relates to a data processing method and system for managing security of a wireless computer device, and more particularly to a technique for authenticating a wireless computer device and applications stored on the device.

BACKGROUND

An enterprise that adopts a bring-your-own device policy is vulnerable when a smartphone or other wireless computer device that includes sensitive enterprise information is stolen or lost. Known security techniques support wiping the stolen or lost device, or wiping or otherwise restricting user access to applications and application data stored on the device. Other known security techniques lock down the ability to place or receive calls on a smartphone that has been lost or stolen. The sensitive information on a lost or stolen device continues to be vulnerable if the subscriber identity module (SIM) card of the device is removed. Someone who steals a device and removes the SIM card of the device may replace the removed SIM card with another SIM card or leave the device without a SIM card. Removal of the SIM card prevents the aforementioned wiping of the device or applications on the device.

BRIEF SUMMARY

In first embodiments, the present invention provides a method of authenticating a device. The method includes, prior to a process of booting the device, a computer generating a device hash based on a subscriber identity module identifier (SIM ID) of the device, an identifier of the device, a number indicating a count of one or more applications secured in an application registry of the device, and one or more names of the one or more applications secured in the application registry. The method further includes the computer generating a temporary hash for the device during the process of booting the device. The method further includes the computer determining whether the device hash matches the temporary hash for the device. The method further includes, if the device hash matches the temporary hash for the device, the computer completing the process of booting the device. The method further includes, if the device hash does not match the temporary hash for the device, the computer removing the one or more applications from the device during the process of booting the device.

In second embodiments, the present invention provides a computer program product. The computer program product includes a computer-readable, tangible storage device; and a computer-readable program code stored in the computer-readable, tangible storage device. The computer-readable program code contains instructions that are executed by a central processing unit (CPU) of a computer system to implement a method of authenticating a device. The method includes, prior to a process of booting the device, the computer system generating a device hash based on a subscriber identity module identifier (SIM ID) of the device, an identifier of the device, a number indicating a count of one or more applications secured in an application registry of the device, and one or more names of the one or more applications secured in the application registry. The method further includes the computer system generating a temporary hash for the device during the process of booting the device. The method further includes the computer system determining whether the device hash matches the temporary hash for the device. The method further includes, if the device hash matches the temporary hash for the device, the computer system completing the process of booting the device. The method further includes, if the device hash does not match the temporary hash for the device, the computer system removing the one or more applications from the device during the process of booting the device.

In third embodiments, the present invention provides a method of authenticating a device. The method includes, prior to a process of loading an application installed on the device, a computer generating an application hash for an application. The application hash is based on a subscriber identity module identifier (SIM ID) of the device, an identifier of the device, and a name of the application. The method further includes the computer generating a temporary hash for the application during the process of loading the application. The method further includes the computer determining whether the application hash matches the temporary hash for the application. The method further includes, if the application hash matches the temporary hash for the application, the computer running the application. The method further includes, if the application hash does not match the temporary hash for the application, the computer removing the application from the device without running the application.

Embodiments of the present invention allow offline authentication of a wireless computer device and its applications after the SIM card of the device is removed.

DETAILED DESCRIPTION

Overview

Embodiments of the present invention provide a security check of a wireless computer device and one or more applications stored on the device during a process of booting the device and during process(es) of loading the application(s). The security check includes a device-level security check of the device and an application-level security check of the application(s). The security check authenticates the device and the applications and will detect a breach of security if a subscriber identity module (SIM) card of the device has been removed or if the SIM card has been removed and replaced. Furthermore, the security check is performed without requiring that the device be connected to a network (i.e., the security check may be performed offline). If the device fails to be authenticated by the device-level security check, the one or more applications stored on the device and the data of the application(s) are automatically removed from the device during the process of booting the device. If an application stored on the device fails to be authenticated by the application-level security check, then the application is removed from the device during the process of loading the application.

By removing or replacing a SIM card in a wireless device, someone who steals the device can circumvent known security check techniques that wipe a wireless device or applications stored on the device, thereby posing a unique challenge to enterprises that allow personnel to bring their own devices to work and store enterprise-sensitive information on the devices. This unique challenge is overcome by one or more embodiments of the present invention.

System for Authenticating a Device and Applications

Figure 1:
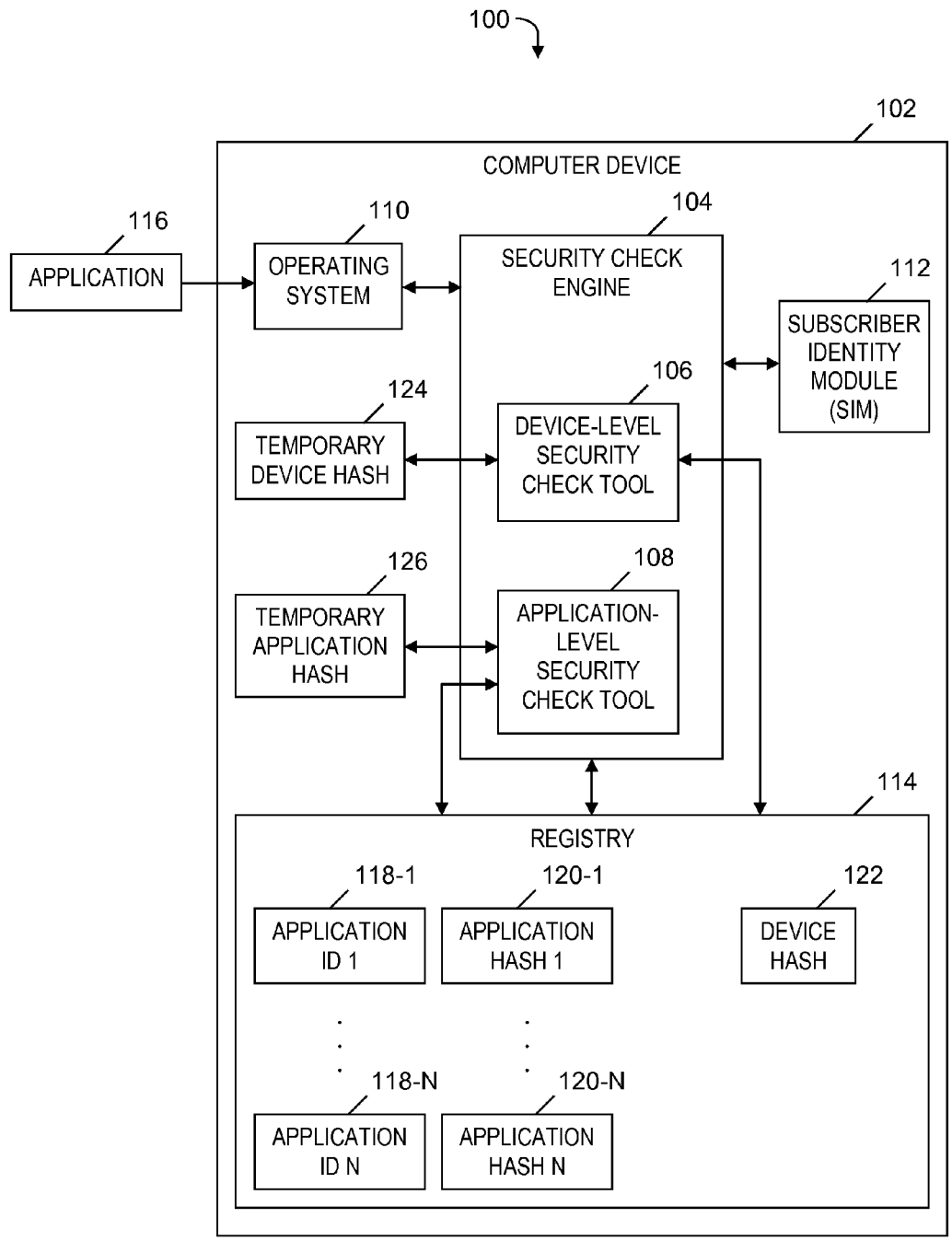
FIG. 1 is a block diagram of a system for authenticating a device and applications stored on the device, in accordance with embodiments of the present invention.

FIG. 1 is a block diagram of a system for authenticating a device and applications stored on the device, in accordance with embodiments of the present invention. System 100 includes a computer device 102, which runs a software-based security check engine 104. Security check engine 104 includes a software-based device-level security check tool 106 and a software-based application-level security check tool 108. Computer device 102 also includes an operating system 110 and a SIM card (not shown), which includes a hardware-based SIM 112. Furthermore, computer device 102 includes a registry 114 (also known as an application registry).

Operating system 110 receives an application 116 being installed on computer device 102. Computer device 102 stores an identifier of application 116 in registry 114 within a list of N application identifiers (IDs) (i.e., application ID 118-1 . . . application ID 118-N), where N is an integer greater than or equal to one. Application-level security check tool 108 generates N application hashes (i.e., application hash 120-1 . . . application hash 120-N), where the N application hashes are associated with N software-based applications in a one-to-one correspondence, where the N applications are identified by the N application IDs in registry 114. An application hash is based on the SIM ID of SIM 112, an identifier (not shown) of computer device 102, a name or other identifier of the application corresponding to the application hash, and bits or other data that provide padding for the application hash. The padding is included in the application hash in order to make it more difficult for an unauthorized entity to figure out how to un-hash the application hash.

In an alternate embodiment, padding may not be used in the application hash and the application hash is based on the SIM ID of SIM 112, the identifier of computer device 102, and the name or other identifier of the application corresponding to the application hash.

In one embodiment, computer device 102 is a smartphone and the identifier of computer device 102 used in the application hash is a phone number of the smartphone.

Device-level security check tool 106 generates a device hash 122 associated with computer device 102. Device hash 122 is based on the SIM ID of SIM 112, an identifier (not shown) of computer device 102, a number indicating a count of one or more applications already listed and secured in registry 114, and one or more names (or other identifiers) of the one or more applications already listed and secured in registry 114. In one embodiment, computer device 102 is a smartphone and the identifier of computer device 102 used in device hash 122 is a phone number of the smartphone.

During a security check of computer device 102 during a process of booting computer device 102, device-level security check tool 106 generates a temporary device hash 124, which is compared to device hash 122.

During a security check of an application being loaded on computer device 102, application-level security check tool 108 generates a temporary application hash 126 for the application being checked. Application-level security check tool 108 finds the application hash in registry 114 that corresponds to the application being checked and subsequently compares the application hash to temporary application hash 126.

The functionality of the components shown in FIG. 1 is described in more detail in the discussion of FIG. 2, FIG. 3, FIG. 4, FIG. 5, and FIG. 6 presented below.

Process for Authenticating a Device and Applications

Figure 2:
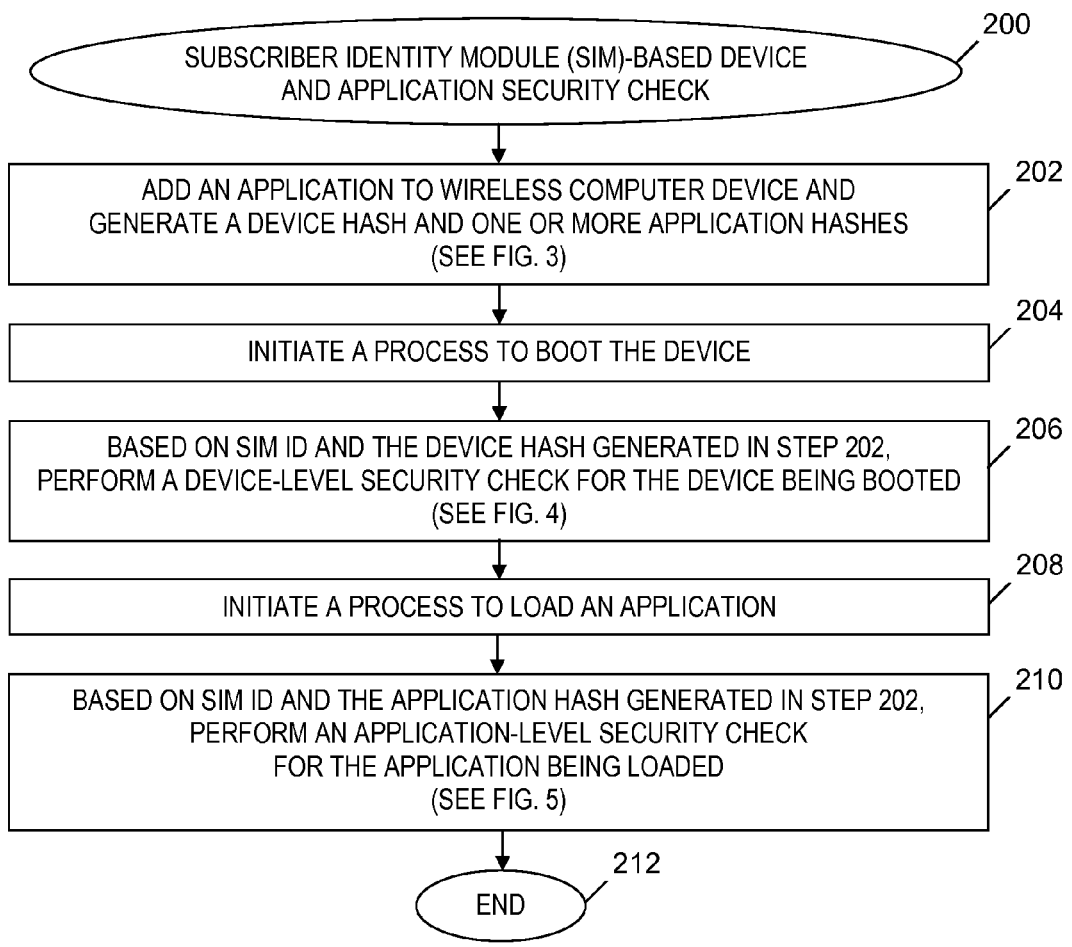
FIG. 2 is a flowchart of a process of authenticating a device and applications stored on the device, where the process is implemented in the system of FIG. 1, in accordance with embodiments of the present invention.

FIG. 2 is a flowchart of a process of authenticating a device and applications stored on the device, where the process is implemented in the system of FIG. 1, in accordance with embodiments of the present invention. The process of FIG. 2 begins at step 200. In step 202, computer device 102 (see FIG. 1) adds (i.e., installs) N applications. During the installation of the N applications, computer device 102 (see FIG. 1) stores N identifiers in registry 114 (see FIG. 1), where the N identifiers identify the N applications, respectively (i.e., application ID 118-1 . . . application ID 118-N (see FIG. 1)). Step 202 also includes device-level security check tool 106 (see FIG. 1) generating device hash 122 (see FIG. 1) for computer device 102 (see FIG. 1), and application-level security check tool 108 (see FIG. 1) generating application hash 120-1 . . . application hash 120-N (see FIG. 1) for application ID 118-1 . . . application ID 118-N (see FIG. 1), in a one-to-one correspondence. In one embodiment, step 202 includes one or more iterations of the process of FIG. 3, which is discussed below. In one embodiment, step 202 is performed prior to a loss of the device. As used herein, a loss of a device includes a state of being without the device by one who formerly had the device, where being without the device is a result of accident, negligence, being stolen, etc.

In step 204, computer device 102 (see FIG. 1) initiates a process to boot computer device 102 (see FIG. 1).

In step 206, which is during the process to boot computer device 102 (see FIG. 1), device-level security check tool 106 (see FIG. 1) performs a device-level security check for computer device 102 (see FIG. 1) based on the SIM ID of SIM 112 (see FIG. 1) and device hash 122 (see FIG. 1). The device-level security check performed in step 206 is described in more detail in the discussion of FIG. 4, which is presented below.

In step 208, after the booting of computer device 102 (see FIG. 1) is completed, computer device 102 (see FIG. 1) initiates a process to load an application identified by application ID 118-1 (see FIG. 1).

In step 210, which is during the process to load the application identified by application ID 118-1 (see FIG. 1), application-level security check tool 108 (see FIG. 1) performs an application-level security check for the application being loaded based on the SIM ID of SIM 112 (see FIG. 1) and application hash 120-1 (see FIG. 1). The application-level security check performed in step 208 is described in more detail in the discussion of FIG. 5, which is presented below.

Following step 210, the process of FIG. 2 ends at step 212. Steps 204 and 206 and/or steps 208 and 210 are performed after a loss of the device and after the device has come into the possession of an unauthorized user, such as someone who has stolen the device.

In an alternate embodiment, instead of performing step 204 after step 202, computer device 102 (see FIG. 1) determines that the device remains in a powered on state, bypasses steps 204 and 206 (i.e., the device-level security check), and proceeds to steps 208 and 210 (i.e., the application-level security check). In this alternate embodiment, the application-level security check identifies a security breach of a SIM card being removed from and replaced in the device while the device remains on, even though the device-level security check is bypassed.

Figure 3:
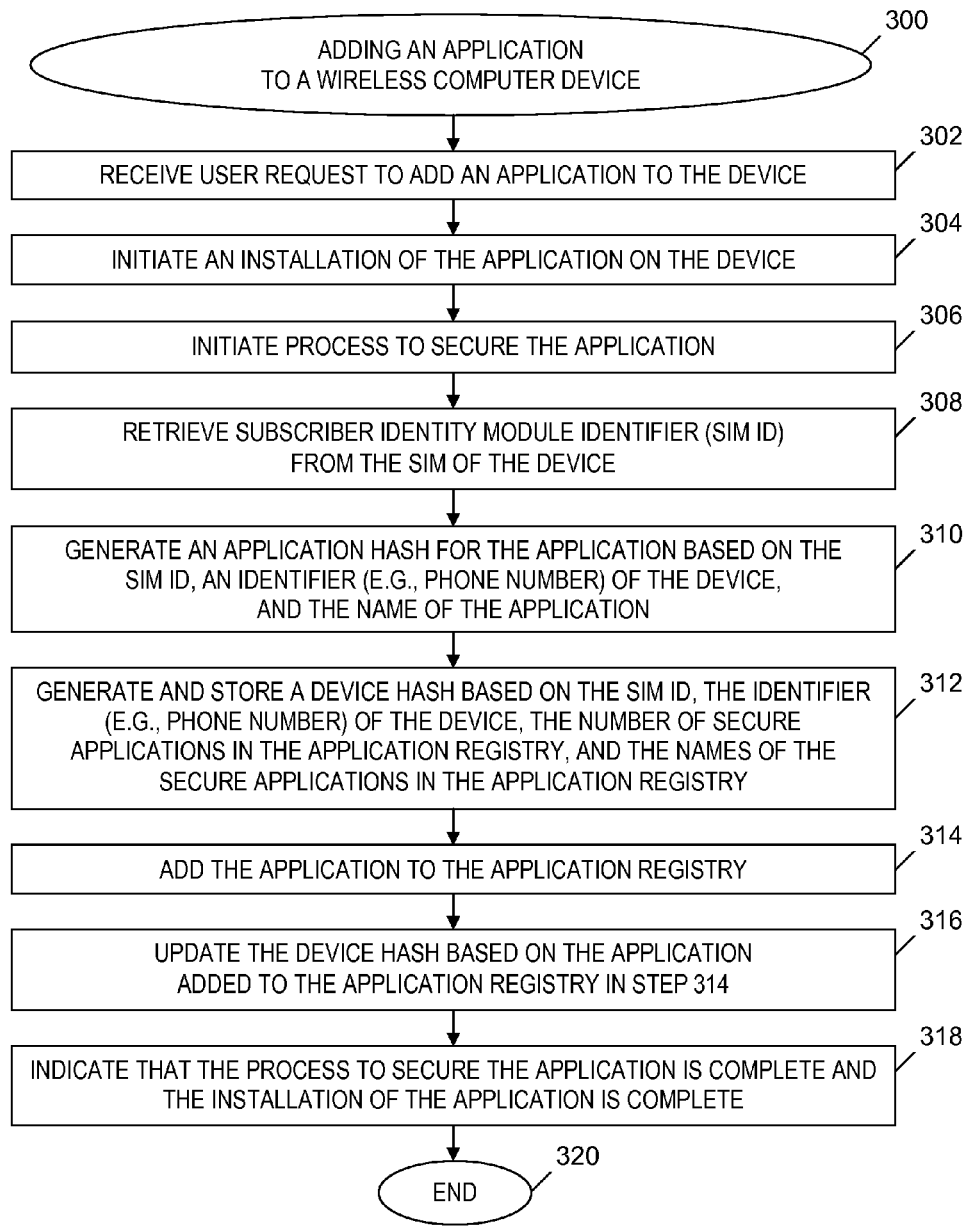
FIG. 3 is a flowchart of a process of adding an application to a device within the process of FIG. 2, in accordance with embodiments of the present invention.

FIG. 3 is a flowchart of a process of adding an application to a device within the process of FIG. 2, in accordance with embodiments of the present invention. The process of FIG. 3 begins at step 300. In step 302, a provider of application 116 (see FIG. 1) receives a user request to add application 116 (see FIG. 1) to computer device 102 (see FIG. 1).

In step 304, operating system 110 (see FIG. 1) receives application 116 (see FIG. 1) from the provider and initiates an installation of application 116 (see FIG. 1) on computer device 102 (see FIG. 1).

In step 306, security check engine 104 (see FIG. 1) receives a request from operating system 110 (see FIG. 1) to initiate a process of securing application 116 (see FIG. 1) and in response, initiates the process of securing application 116 (see FIG. 1).

In step 308, security check engine 104 (see FIG. 1) retrieves a SIM ID of SIM 112 (see FIG. 1) from a SIM card of computer device 102 (see FIG. 1). In step 308, security check engine 104 (see FIG. 1) also retrieves an identifier (e.g., phone number) of computer device 102 (see FIG. 1), the name of application 116 (see FIG. 1), and the name(s) of the N applications whose identifiers are stored in registry 114 (see FIG. 1) (i.e., the name(s) of the secure application(s)). As used herein, a secure application is an application whose identifier is listed in registry 114 (see FIG. 1). Furthermore in step 308, security check engine 104 (see FIG. 1) determines the number of secure application(s) included in registry 114 (see FIG. 1) (i.e., determines the number of applications corresponding to the identifiers in the list of application ID 118-1 . . . application ID 118-N (see FIG. 1) in registry 114 (see FIG. 1)).

In step 310, application-level security check tool 108 (see FIG. 1) generates an application hash (e.g., application hash 120-1 in FIG. 1) for application 116 (see FIG. 1), where the application hash is based on the SIM ID retrieved in step 308, the identifier (e.g., phone number) of computer device 102 (see FIG. 1) retrieved in step 308, the name of application 116 (see FIG. 1) retrieved in step 308, and a padding of bits, characters or other data. In one embodiment, the padding is predefined and supplied by a user prior to step 310.

In one embodiment, step 310 includes application-level security check tool 108 (see FIG. 1) generating the application hash by concatenating the aforementioned SIM ID, phone number of computer device 102 (see FIG. 1), name of application 116 (see FIG. 1), and the padding.

In step 312, device-level security check tool 106 (see FIG. 1) generates device hash 122 (see FIG. 1) based on the SIM ID retrieved in step 308, the identifier (e.g., phone number) of computer device 102 (see FIG. 1) retrieved in step 308, the number of secure application(s) determined in step 308, and the name(s) of the secure application(s) retrieved in step 308. Also in step 312, and following the generation of the device hash, device-level security check tool 106 (see FIG. 1) stores the generated device hash 122 (see FIG. 1) in registry 114 (see FIG. 1) or in another data repository coupled to computer device 102 (see FIG. 1).

In one embodiment, step 312 includes device-level security check tool 106 (see FIG. 1) generating device hash 122 (see FIG. 1) by concatenating the aforementioned SIM ID, phone number of computer device 102 (see FIG. 1), number of secure application(s), and name(s) of secure application(s).

In step 314, security check engine 104 (see FIG. 1) adds application 116 (see FIG. 1) to registry 114 (see FIG. 1) by storing in registry 114 (see FIG. 1) an identifier of application 116 (see FIG. 1) (e.g., application ID 118-1 (see FIG. 1)) in association with the application hash generated in step 310.

Because an application has been added to registry 114 (see FIG. 1), device hash 122 (see FIG. 1) is outdated in response to step 314 being completed. After step 314 and prior to step 316, security check engine 104 (see FIG. 1) retrieves an updated list of names of the applications whose identifiers are stored in registry 114 (see FIG. 1), including the name of application 116 (see FIG. 1), and determines an updated number of secure application(s) included in registry 114 (see FIG. 1), where the updated number counts application 116 (see FIG. 1).

In step 316, device-level security check tool 106 (see FIG. 1) updates device hash 122 (see FIG. 1) so that device hash 122 (see FIG. 1) is based on the SIM ID retrieved in step 308, the identifier (e.g., phone number) of computer device 102 (see FIG. 1) retrieved in step 308, the number of secure applications updated after step 314 and prior to step 316, and the names of the secure applications updated after step 314 and prior to step 316.

In step 318, security check engine 104 (see FIG. 1) sends an indication to operating system 110 (see FIG. 1) that the process of adding and securing application 116 (see FIG. 1) to registry 114 (see FIG. 1) is complete, and in response, operating system 110 (see FIG. 1) sends an indication to a user that the installation of application 116 (see FIG. 1) is complete.

Following step 318, the process of FIG. 3 ends at step 320.

Figure 4:
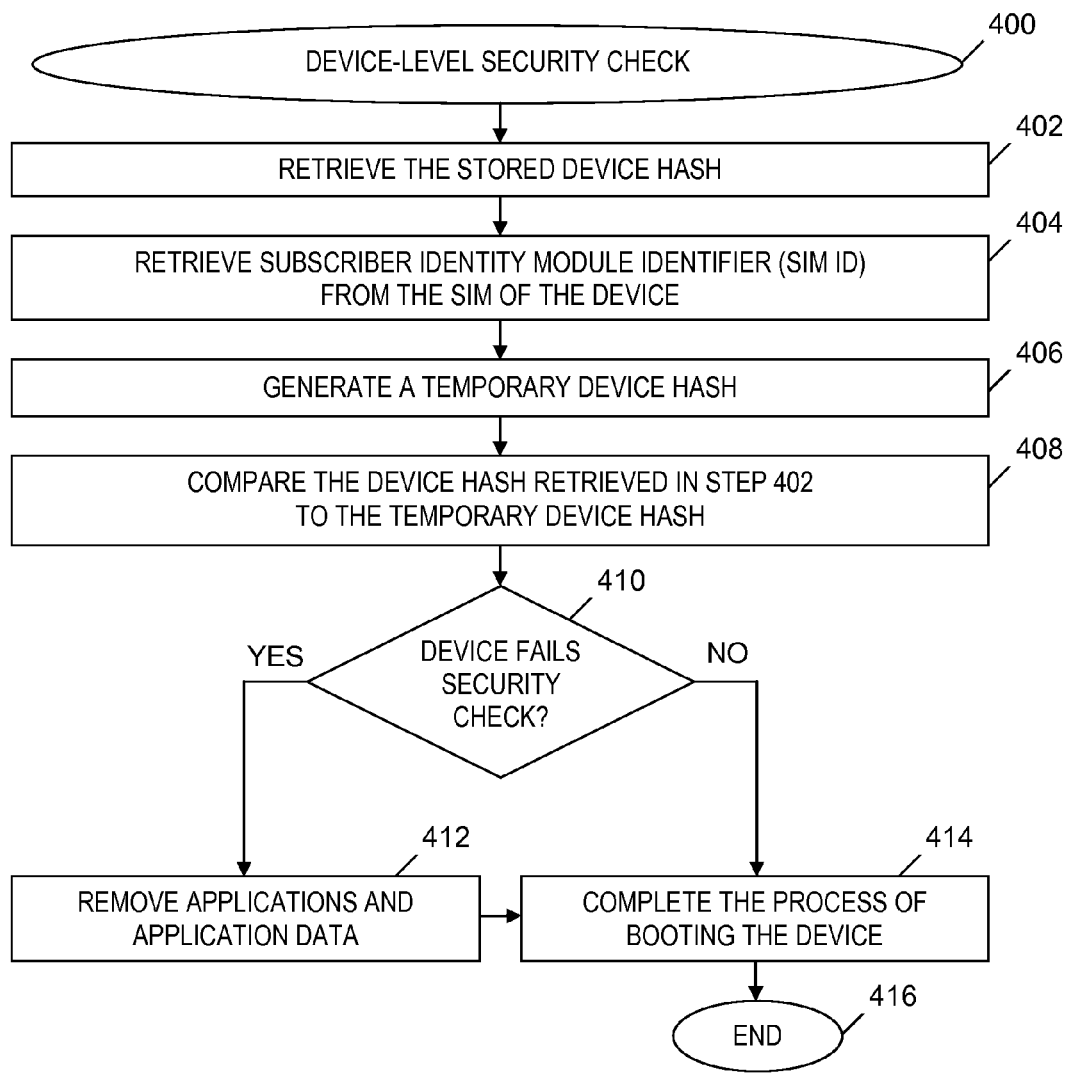
FIG. 4 is a flowchart of a device-level security check included in the process of FIG. 2, in accordance with embodiments of the present invention.

FIG. 4 is a flowchart of a device level security check included in the process of FIG. 2, in accordance with embodiments of the present invention. The process of FIG. 4 starts at step 400. Prior to step 402, operating system 110 (see FIG. 1) sends an instruction to security check engine 104 (see FIG. 1) to initiate the device-level security check of computer device 102 (see FIG. 1) during a process of booting computer device 102 (see FIG. 1). In step 402, in response to security check engine 104 (see FIG. 1) receiving the instruction to initiate the device-level security check, device-level security check tool 106 (see FIG. 1) retrieves device hash 122 (see FIG. 1) from registry 114 (see FIG. 1) or from another data repository coupled to computer device 102 (see FIG. 1).

In step 404, device-level security check tool 106 (see FIG. 1) retrieves the SIM ID of SIM 112 (see FIG. 1), which is included in a SIM card in computer device 102 (see FIG. 1). Step 404 also includes device-level security check tool 106 (see FIG. 1) retrieving the identifier (e.g., phone number) of computer device 102 (see FIG. 1) and the name(s) of the secure application(s) whose identifiers are included in registry 114 (see FIG. 1), and determining the number of secure application(s) in registry 114 (see FIG. 1).

In step 406, device-level security check tool 106 (see FIG. 1) generates temporary device hash 124 (see FIG. 1) based on the SIM ID, identifier of computer device 102 (see FIG. 1), and the name(s) of the secure application(s) retrieved in step 404, and the number of secure applications determined in step 404. The generation of the temporary device hash uses the same technique used to generate device hash 122 (see FIG. 1) in step 312 and step 316 in FIG. 3. For example, if step 312 and step 316 in FIG. 3 generates or updates device hash 122 (see FIG. 1) by concatenating the SIM ID, the phone number of computer device 102 (see FIG. 1), the number of secure applications, and the name(s) of the secure application(s), then step 406 generates temporary device hash 124 (see FIG. 1) by concatenating the SIM ID, the phone number of computer device 102 (see FIG. 1), the number of secure applications, and the name(s) of the secure application(s) as retrieved or determined in step 404.

In step 408, device-level security check tool 106 (see FIG. 1) compares device hash 122 (see FIG. 1) (i.e., the device hash retrieved in step 402) to temporary device hash 124 (see FIG. 1) (i.e., the temporary device hash generated in step 406) to determine whether device hash 122 (see FIG. 1) matches temporary device hash 124 (see FIG. 1).

In step 410, device-level security check tool 106 (see FIG. 1) determines whether computer device 102 (see FIG. 1) fails the device-level security check. Computer device 102 (see FIG. 1) fails the device-level security check if device-level security check tool 106 (see FIG. 1) determines that device hash 122 (see FIG. 1) does not match temporary device hash 124 (see FIG. 1) as a result of the comparison in step 408. Computer device 102 (see FIG. 1) passes the device-level security check if device-level security check tool 106 (see FIG. 1) determines that device hash 122 (see FIG. 1) matches temporary device hash 124 (see FIG. 1) as a result of the comparison in step 408.

If device-level security check tool 106 (see FIG. 1) determines in step 410 that computer device 102 (see FIG. 1) fails the device-level security check, then the Yes branch of step 410 is taken and step 412 is performed. In step 412, security check engine 104 (see FIG. 1) removes the application(s) identified in registry 114 (see FIG. 1) from computer device 102 (see FIG. 1) and also removes the data of the aforementioned application(s) from computer device 102 (see FIG. 1).

In step 414, security check engine 104 (see FIG. 1) sends an indication to operating system 110 (see FIG. 1) that the process of booting computer device 102 (see FIG. 1) is complete. Following step 414, the process of FIG. 4 ends at step 416. In one embodiment, if the process of FIG. 4 ends after taking the Yes branch of step 410, and performing step 412 and performing step 414, then step 210 (see FIG. 2) may be deleted because applications have already been removed in step 412.

Returning to step 410, if device-level security check tool 106 (see FIG. 1) determines that computer device 102 (see FIG. 1) passes the device-level security check, then the No branch of step 410 is taken and step 414 is performed, as described above. Again, following step 414, the process of FIG. 4 ends at step 416.

Figure 5:
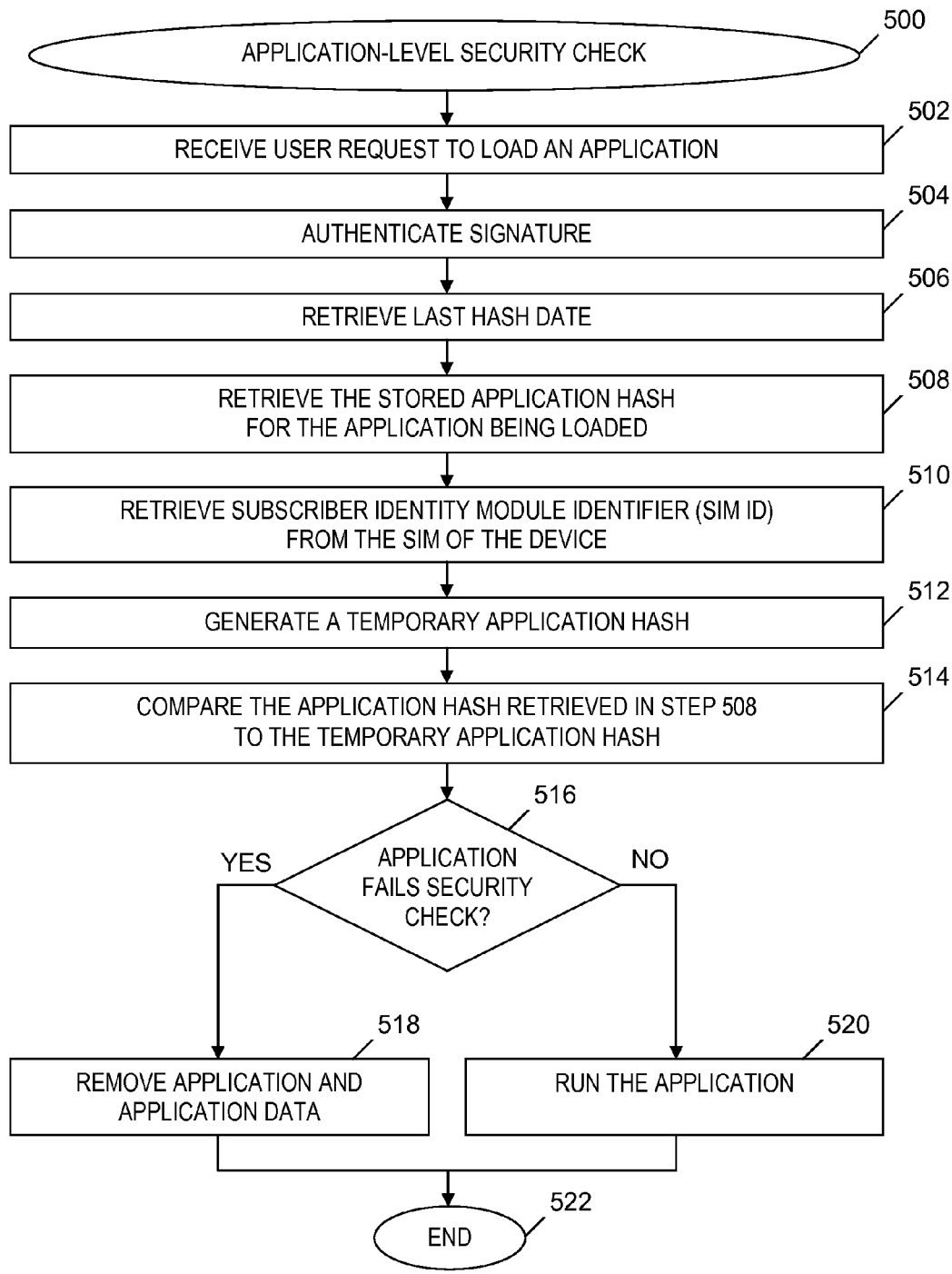
FIG. 5 is a flowchart of an application-level security check included in the process of FIG. 2, in accordance with embodiments of the present invention.

FIG. 5 is a flowchart of an application level security check included in the process of FIG. 2, in accordance with embodiments of the present invention. The process of FIG. 5 starts at step 500. In step 502, operating system 110 (see FIG. 1) receives from a user a request to load an application (e.g., the application whose identifier is application ID 118-1 in FIG. 1). Hereinafter, in the discussion of FIG. 5, the application being loaded is referred to simply as "the application."

In step 504, operating system 110 (see FIG. 1) sends an instruction to security check engine 104 (see FIG. 1) to authenticate an application hash (e.g., application hash 120-1 in FIG. 1).

In step 506, security check engine 104 (see FIG. 1) retrieves the last hash date (i.e., date of the most recent hash).

In step 508, application-level security check tool 108 (see FIG. 1) retrieves an application hash (e.g., application hash 120-1 in FIG. 1) from registry 114 (see FIG. 1).

In step 510, application-level security check tool 108 (see FIG. 1) retrieves the SIM ID of SIM 112 (see FIG. 1), which is included in a SIM card in computer device 102 (see FIG. 1). Step 510 also includes application-level security check tool 108 (see FIG. 1) retrieving the identifier (e.g., phone number) of computer device 102 (see FIG. 1), the name of the application, and the predefined padding of bits, characters or other data.

In step 512, application-level security check tool 108 (see FIG. 1) generates temporary application hash 126 (see FIG. 1) based on the SIM ID, identifier of computer device 102 (see FIG. 1), name of the application, and the padding retrieved in step 510. The generation of the temporary application hash uses the same technique used to generate the application hash in step 310 (see FIG. 3). For example, if step 310 in FIG. 3 generates application hash 120-1 (see FIG. 1) by concatenating the SIM ID, the phone number of computer device 102 (see FIG. 1), the name of the application, and the predefined padding of bits, then step 512 generates temporary application hash 126 (see FIG. 1) by concatenating the SIM ID, the phone number of computer device 102 (see FIG. 1), the name of the application, and the predefined padding retrieved in step 510.

In step 514, application-level security check tool 108 (see FIG. 1) compares the application hash retrieved in step 508 (e.g., application hash 120-1 in FIG. 1) to temporary application hash 126 (see FIG. 1) (i.e., the temporary application hash generated in step 512) to determine whether the application hash retrieved in step 508 matches temporary application hash 126 (see FIG. 1).

In step 516, application-level security check tool 108 (see FIG. 1) determines whether the application fails the application-level security check. The application fails the application-level security check if application-level security check tool 108 (see FIG. 1) determines that the application hash retrieved in step 508 does not match temporary application hash 126 (see FIG. 1) as a result of the comparison in step 514. The application passes the application-level security check if application-level security check tool 108 (see FIG. 1) determines that application hash 122 (see FIG. 1) matches temporary application hash 126 (see FIG. 1) as a result of the comparison in step 514.

If application-level security check tool 106 (see FIG. 1) determines in step 516 that the application fails the application-level security check, then the Yes branch of step 516 is taken and step 518 is performed. In step 518, security check engine 104 (see FIG. 1) removes the application from in registry 114 (see FIG. 1) (e.g., removes application ID 118-1 and application hash 120-1 in FIG. 1), and also removes the data of the application from computer device 102 (see FIG. 1). Following step 518, the process of loading the application ends.

Returning to step 516, if application-level security check tool 108 (see FIG. 1) determines that the application passes the application-level security check, then the No branch of step 516 is taken and step 520 is performed. In step 520, security check engine 104 (see FIG. 1) sends an instruction to operating system 110 (see FIG. 1) to run the application. In response to receiving the instruction, operating system 110 (see FIG. 1) runs the application. Following step 520, the process of loading the application is complete. Following step 518 and step 520, the process of FIG. 5 ends at step 522.

Computer System

Figure 6:
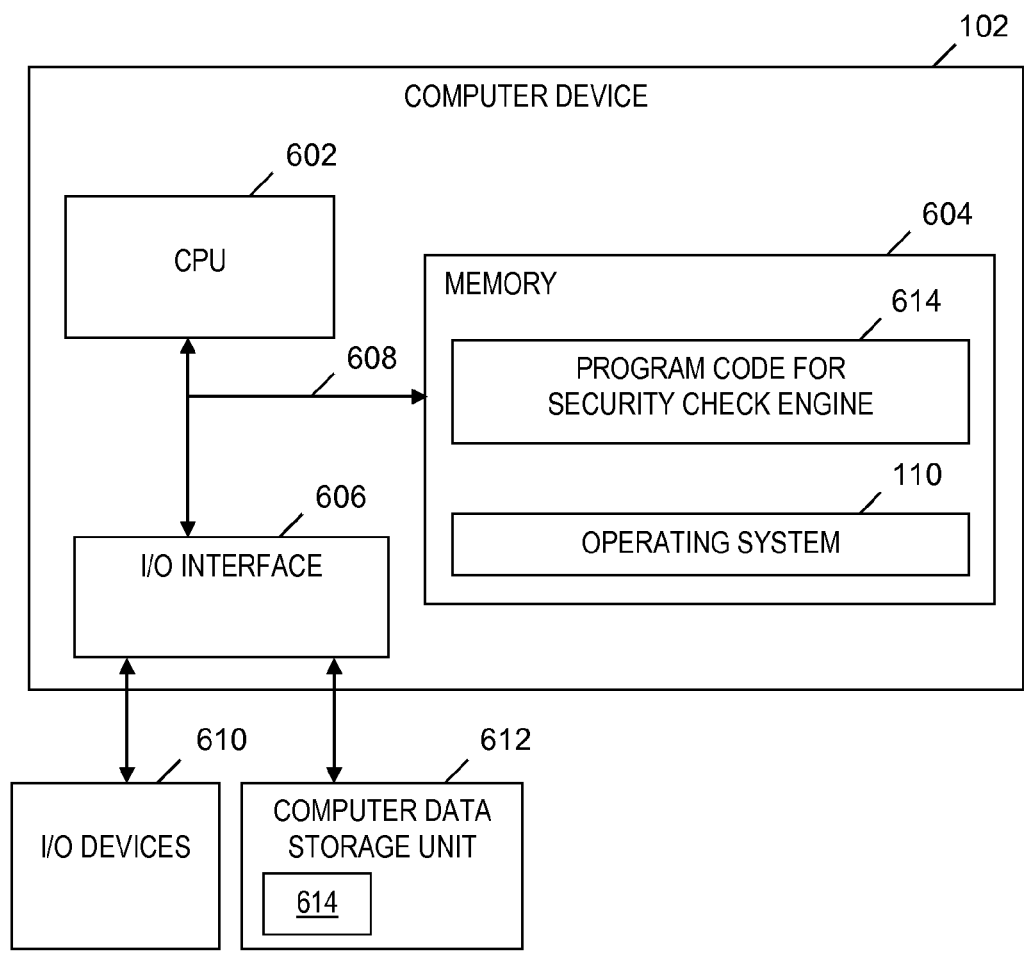
FIG. 6 is a block diagram of a computer device that is included in the system of FIG. 1 and that implements the processes of FIG. 2, FIG. 3, FIG. 4 and FIG. 5, in accordance with embodiments of the present invention.

FIG. 6 is a block diagram of a computer device that is included in the system of FIG. 1 and that implements the processes of FIG. 2, FIG. 3, FIG. 4 and FIG. 5, in accordance with embodiments of the present invention. Computer device 102 is a computer system that generally includes a central processing unit (CPU) 602, a memory 604, an input/output (I/O) interface 606, and a bus 608. Further, computer device 102 is coupled to I/O devices 610 and a computer data storage unit 612. CPU 602 performs computation and control functions of computer device 102, including carrying out instructions included in program code 614 to perform a method of authenticating a device and applications stored on the device, where the instructions are carried out by CPU 602 via memory 604. CPU 602 may include a single processing unit, or be distributed across one or more processing units in one or more locations (e.g., on a client and server). Program code 614 includes program code for device-level security check tool 106 (see FIG. 1) and application-level security check tool 108 (see FIG. 1).

Memory 604 includes a known computer-readable storage medium, which is described below. In one embodiment, cache memory elements of memory 604 provide temporary storage of at least some program code (e.g., program code 614) in order to reduce the number of times code must be retrieved from bulk storage while instructions of the program code are carried out. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display device, keyboard, etc. Bus 608 provides a communication link between each of the components in computer device 102, and may include any type of transmission link, including electrical, optical, wireless, etc.

I/O interface 606 also allows computer device 102 to store information (e.g., data or program instructions such as program code 614) on and retrieve the information from computer data storage unit 612 or another computer data storage unit (not shown). Computer data storage unit 612 includes a known computer-readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are carried out by CPU 602 via memory 604 to authenticate a device and applications stored on the device. Although FIG. 6 depicts memory 604 as including program code 614, the present invention contemplates embodiments in which memory 604 does not include all of code 614 simultaneously, but instead at one time includes only a portion of code 614.

Further, memory 604 includes operating system 110 and may include other systems not shown in FIG. 6. Operating system 110 may be a Linux®-based operating system that runs on CPU 602 and provides control of various components within and/or connected to computer device 102. Linux is a registered trademark of Linus Torvalds in the United States, other countries, or both.

Storage unit 612 and/or one or more other computer data storage units (not shown) that are coupled to computer device 102 may store registry 114 (see FIG. 1), temporary device hash 124 (see FIG. 1) and/or temporary application hash 126 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 604 and/or computer data storage unit 612) having computer-readable program code (e.g., program code 614) embodied or stored thereon.

Any combination of one or more computer-readable mediums (e.g., memory 604 and computer data storage unit 612) may be utilized. The computer-readable medium may be (1) a computer-readable storage medium, or (2) a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 614) for use by or in connection with a system, apparatus, or device for carrying out instructions in the program, and which does not propagate.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 614) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 614) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer device 102 or another computer system (not shown) having components analogous to the components of computer device 102 included in FIG. 6. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIG. 3, FIG. 4 and FIG. 5) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to one or more hardware processors (e.g., CPU 602) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer (e.g., computer device 102), other programmable data processing apparatus, or other devices to function in a particular manner, such that the instructions (e.g., program 614) stored in the computer-readable medium produce an article of manufacture including instructions which implement the function/act specified in the flowchart and/or block diagram block or blocks.

The computer program instructions may also be loaded onto a computer (e.g., computer device 102), other programmable data processing apparatus, or other devices to cause a series of operational steps to be performed on the computer, other programmable apparatus, or other devices to produce a computer implemented process such that the instructions (e.g., program 614) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to authenticating a device and applications stored on the device. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer device 102) including one or more processors (e.g., CPU 602), wherein the processor(s) carry out instructions contained in the code causing the computer system to authenticate a device and applications stored on the device. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of authenticating a device and applications stored on the device.

While it is understood that program code 614 for authenticating a device and applications stored on the device may be deployed by manually loading directly in client, server and proxy computers (not shown) via loading a computer-readable storage medium (e.g., computer data storage unit 612), program code 614 may also be automatically or semi-automatically deployed into computer device 102 by sending program code 614 to a central server (e.g., computer device 102) or a group of central servers. Program code 614 is then downloaded into client computers (not shown) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of authenticating a device and applications stored on the device. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The flowcharts in FIG. 2, FIG. 3, FIG. 4 and FIG. 5 and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 614), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of authenticating a device, the method comprising the steps of:

prior to a loss of the device, retrieving, by a computer, a first subscriber identity module identifier (SIM ID) from a first SIM card of the device and retrieving an identifier of the device, and determining, by the computer, a number indicating a count of one or more applications secured in an application registry of the device and determining one or more names of the one or more applications secured in the application registry;

prior to a process of booting the device, generating, by the computer, a device hash by concatenating the first SIM ID retrieved prior to the loss, the identifier of the device retrieved prior to the loss, the number indicating the count of the one or more applications determined prior to the loss, and the one or more names of the one or more applications determined prior to the loss;

after the loss of the device, retrieving, by the computer, a second SIM ID from a second SIM card of the device, the second SIM ID being different from the first SIM ID, and the second SIM card being different from the first SIM card, retrieving, by the computer, the identifier of the device, and determining, by the computer, the number indicating the count of the one or more applications secured in the application registry of the device, and determining the one or more names of the one or more applications secured in the application registry of the device;

during the process of booting the device, generating, by the computer, a temporary hash for the device by concatenating the second SIM ID retrieved after the loss, the identifier of the device retrieved after the loss, the number indicating the count of the one or more applications determined after the loss, and the one or more names of the one or more applications determined after the loss;

determining, by the computer, whether the device hash matches the temporary hash for the device;

if the device hash matches the temporary hash for the device, completing, by the computer, the process of booting the device; and if the device hash does not match the temporary hash for the device, removing, by the computer, the one or more applications from the device during the process of booting the device.

2. The method of claim 1, further comprising the steps of:
determining, by the computer, the device hash does not match the temporary hash for the device; and
responsive to the step of determining the device hash does not match the temporary hash for the device, determining, by the computer, the device fails a security check and removing the one or more applications from the device during the process of booting the device, wherein the step of determining the device fails the security check does not require the device to be connected to a computer network.

3. The method of claim 1, further comprising the steps of:
generating, by the computer, an application hash for an application, the application hash based on the SIM ID, the identifier of the device, and a name of the application;
generating, by the computer, a temporary hash for the application during a process of loading the application;
determining, by the computer, whether the application hash matches the temporary hash for the application;
if the application hash matches the temporary hash for the application, running, by the computer, the application; and
if the application hash does not match the temporary hash for the application, removing, by the computer, the application from the device without running the application.

4. The method of claim 3, further comprising the steps of:
determining, by the computer, the application hash does not match the temporary hash for the application; and
responsive to the step of determining the application hash does not match the temporary hash for the application, determining, by the computer, the device fails a security check and removing the application from the device during the process of loading the application, wherein the step of determining the device fails the security check does not require the device to be connected to a computer network.

5. The method of claim 1, further comprising the steps of:
initiating, by the computer, an installation of an application on the device;
securing, by the computer, the application by adding the application to the application registry; and
updating, by the computer, the device hash by updating the number to indicate another count of the application and the one or more applications, and by updating the one or more names to include a name of the application.

6. The method of claim 5, further comprising the steps of:
subsequent to a completion of the process of booting the device, generating, by the computer, another temporary hash for the device during another process of booting the device;
determining, by the computer, whether the updated device hash matches the other temporary hash for the device;
if the updated device hash matches the other temporary hash for the device, completing, by the computer, the other process of booting the device; and
if the updated device hash does not match the other temporary hash for the device, removing, by the computer, the application and the one or more applications from the device during the other process of booting the device.

7. The method of claim 1, wherein the device is a smartphone and the identifier of the device is a phone number of the smartphone.

8. A computer program product, comprising: a computer-readable, tangible storage device; and a computer-readable program code stored in the computer-readable, tangible storage device, the computer-readable program code containing instructions that are executed by a central processing unit (CPU) of a computer system to implement a method of authenticating a device, the method comprising the steps of:

prior to a loss of the device, retrieving, by the computer system, a first subscriber identity module identifier (SIM ID) from a first SIM card of the device and retrieving an identifier of the device, and determining, by the computer system, a number indicating a count of one or more applications secured in an application registry of the device and determining one or more names of the one or more applications secured in the application registry;

prior to a process of booting the device, generating, by the computer system, a device hash concatenating the first SIM ID retrieved prior to the loss, the identifier of the device retrieved prior to the loss, the number indicating the count of the one or more applications determined prior to the loss, and the one or more names of the one or more applications determined prior to the loss;

after the loss of the device, retrieving, by the computer system, a second SIM ID from a second SIM card of the device, the second SIM ID being different from the first SIM ID, and the second SIM card being different from the first SIM card, retrieving, by the computer system, the identifier of the device, and determining, by the computer system, the number indicating the count of the one or more applications secured in the application registry of the device, and determining the one or more names of the one or more applications secured in the application registry of the device;

during the process of booting the device, generating, by the computer system, a temporary hash for the device by concatenating the second SIM ID retrieved after the loss, the identifier of the device retrieved after the loss, the number indicating the count of the one or more applications determined after the loss, and the one or more names of the one or more applications determined after the loss;

determining, by the computer system, whether the device hash matches the temporary hash for the device;

if the device hash matches the temporary hash for the device, completing, by the computer system, the process of booting the device; and if the device hash does not match the temporary hash for the device, removing, by the computer system, the one or more applications from the device during the process of booting the device.

9. The program product of claim 8, wherein the method further comprises the steps of:
determining, by the computer system, the device hash does not match the temporary hash for the device; and
responsive to the step of determining the device hash does not match the temporary hash for the device, determining, by the computer system, the device fails a security check and removing the one or more applications from the device during the process of booting the device, wherein the step of determining the device fails the security check does not require the device to be connected to a computer system network.

10. The program product of claim 8, wherein the method further comprises the steps of:
generating, by the computer system, an application hash for an application, the application hash based on the SIM ID, the identifier of the device, and a name of the application;
generating, by the computer system, a temporary hash for the application during a process of loading the application;
determining, by the computer system, whether the application hash matches the temporary hash for the application;
if the application hash matches the temporary hash for the application, running, by the computer system, the application; and
if the application hash does not match the temporary hash for the application, removing, by the computer system, the application from the device without running the application.

11. The program product of claim 10, wherein the method further comprises the steps of:
determining, by the computer system, the application hash does not match the temporary hash for the application; and
responsive to the step of determining the application hash does not match the temporary hash for the application, determining, by the computer system, the device fails a security check and removing the application from the device during the process of loading the application, wherein the step of determining the device fails the security check does not require the device to be connected to a computer system network.

12. The program product of claim 8, wherein the method further comprises the steps of:
initiating, by the computer system, an installation of an application on the device;
securing, by the computer system, the application by adding the application to the application registry; and
updating, by the computer system, the device hash by updating the number to indicate another count of the application and the one or more applications, and by updating the one or more names to include a name of the application.

13. The program product of claim 12, wherein the method further comprises the steps of:
subsequent to a completion of the process of booting the device, generating, by the computer system, another temporary hash for the device during another process of booting the device;
determining, by the computer system, whether the updated device hash matches the other temporary hash for the device;
if the updated device hash matches the other temporary hash for the device, completing, by the computer system, the other process of booting the device; and
if the updated device hash does not match the other temporary hash for the device, removing, by the computer system, the application and the one or more applications from the device during the other process of booting the device.

14. The program product of claim 8, wherein the device is a smartphone and the identifier of the device is a phone number of the smartphone.

15. A method of authenticating a device, the method comprising the steps of:
prior to a loss of the device, retrieving, by a computer, a first subscriber identity module identifier (SIM ID) from a first SIM card of the device, retrieving an identifier of the device, and retrieving a name of an application installed on the device;
prior to a process of loading the application installed on the device, generating, by a computer, an application hash for the application by concatenating the first SIM ID retrieved prior to the loss, the identifier of the device retrieved prior to the loss, the name of the application retrieved prior to the loss, and padding bits;
after the loss of the device, retrieving, by the computer, a second SIM ID from a second SIM card of the device, the second SIM ID being different from the first SIM ID, and the second SIM card being different from the first SIM card, retrieving, by the computer, the identifier of the device, and the computer retrieving the name of the application;
during the process of loading the application, generating, by the computer, a temporary hash for the application by concatenating the second SIM ID retrieved after the loss, the identifier of the device retrieved after the loss, the name of the application retrieved after the loss, and the padding bits;
determining, by the computer, whether the application hash matches the temporary hash for the application;
if the application hash matches the temporary hash for the application, running, by the computer, the application; and if the application hash does not match the temporary hash for the application, removing, by the computer, the application from the device during the process of loading the application and without running the application.

16. The method of claim 15, further comprising the steps of:
   determining, by the computer, the application hash does not match the temporary hash for the application; and
   responsive to the step of determining the application hash does not match the temporary hash for the application, determining, by the computer, the device fails a security check and removing the application from the device during the process of loading the application, wherein the step of determining the device fails the security check does not require the device to be connected to a computer network.

17. The method of claim 15, wherein the device is a smartphone and the identifier of the device is a phone number of the smartphone.

\* \* \* \* \*